UNITED STATES PATENT OFFICE.

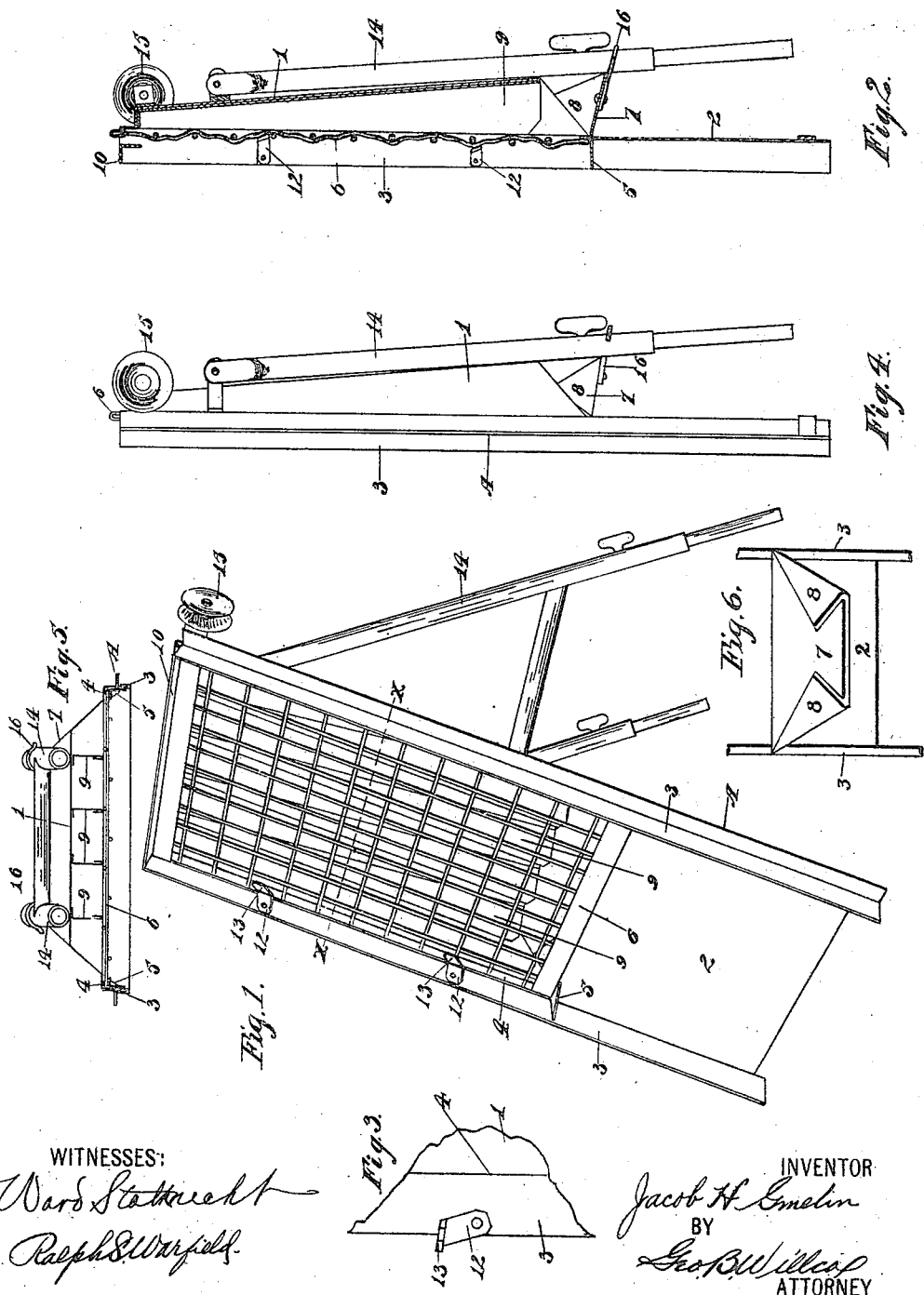

WILLIAM H. GOSS, OF STONINGTON, MAINE.

PIPE-COUPLING.

964,238.

Specification of Letters Patent.   Patented July 12, 1910.

Application filed July 13, 1909.   Serial No. 507,312.

*To all whom it may concern:*

Be it known that I, WILLIAM H. Goss, a citizen of the United States, and a resident of Stonington, in the county of Hancock and State of Maine, have invented a new and Improved Pipe-Coupling, of which the following is a full, clear, and exact description.

The invention is an improvement in couplings for pipes, both flexible and inflexible, and has in view a coupling which can be readily assembled and disjointed without requiring other tools than the hands.

To this end the invention in general consists of two telescoping tubular members, with the outer member provided with an interior gasket closely fitting around the inner member and forming a fluid-tight joint therewith, each member having a pipe connection at its outer end, and latches carried by one of the members and adapted to engage with the other and hold the two members assembled.

Reference is to be had to the accompanying drawings forming a part of this specification, in which similar characters of reference indicate corresponding parts in all the views.

Figure 1 is a central longitudinal section through a pipe coupling embodying my invention; Fig. 2 is a side view of the same, looking in a direction at right-angles to the showing in Fig. 1; Fig. 3 is a cross-section on the line 3—3 of Fig. 1, looking in the direction of the arrow; Fig. 4 is a perspective view of a nipple constituting one of the telescoping members of the coupling; Fig. 5 is a similar view of the other member or pipe section of the coupling; and Fig. 6 is an inner face view of the device for securing the two telescoping members of the coupling together, showing the latches spread apart.

The coupling essentially consists of two telescoping tubular members 10 and 11, the outer member or pipe section having an internal annular groove in which a gasket 12 is seated, closely fitting around the inner member or nipple 11 and forming a water-tight joint therewith. The pipe section and nipple are provided with pipe connections at their outer ends, 13 and 14 respectively, each connection being in the nature of an internal thread. The nipple 11 is constructed to extend into the pipe section 10 a substantial distance and is provided with a collar 15 integrally formed to limit the insertion of the nipple, the collar being preferably equal in external diameter to the outer diameter of the pipe section and having an annular groove 16 in its outer face.

The coupling will ordinarily be used to connect the two sections of a hose, 17 and 18 respectively, each section having a closely-fitting internal nipple 19, the shank of which is corrugated to prevent the hose from slipping off, and the outer end portion threaded to screw into either the nipple or pipe section.

In the arrangement shown in Figs. 1 and 2, I have introduced a cock 20 for controlling the flow of the fluid in the pipe, with one of the nipples 19 threaded into the cock, and the shank of the cock threaded into the pipe section 13 and binding a ring 21 between them, the ring having outwardly-projecting lugs 22 at diametrically opposite points, on which are hinged latches 23. Each latch is preferably constructed of a single piece of wire bent in the form of a loop, with the outer end of the loop turned inwardly and made to conform to the curvature of the reduced portion of the nipple 11 at the outside of the collar 15, as shown in dotted outline in Fig. 3, the latches being of such length as to snap into the groove 16 in the outer face of the collar and lock the two members of the coupling together when the said members are assembled. When it is desired to separate the two sections of the hose or pipe, the same is easily accomplished by swinging the latches out of engagement with the nipple and pulling the nipple and pipe section of the coupling directly apart. Re-connecting of the pipe sections is as readily performed by a reversal of the operation.

Having thus described my invention, I claim as new and desire to secure by Letters Patent:

1. The combination in a pipe coupling, of two telescoping tubular members each having a pipe connection at its outer end portion, a ring having outwardly-projecting lugs, a pipe threaded into the pipe connection of one of said members and binding the ring to the end thereof, and wire loops hinged to the projections of the ring and having inwardly-turned portions adapted to engage with the other member and lock the two members together.

2. The combination in a pipe coupling, of screen overlaps the upper end of the extension 2 and rests upon the abutments 5, 5. The screen intermediate its edges is supported by the free longitudinal edges of the ribs 9, 9. This is a feature of great importance and prevents the sagging of the screen, thereby increasing and prolonging its utility.

In order to retain the screen against outward movement, I may provide suitable locking means, as the catches 12, pivotally secured to the inner faces of the sides. The locking means may be of any convenient style, the catches shown being angular, whereby the feet 13, when the catches are moved to locked position, engage and lie upon the screen, as shown. These catches are so arranged that they may assume the position shown in Fig. 3, to receive and engage an extra thick screen.

The screen itself is preferably formed of rolled steel wire which is given a sinuous or undulating form. These wires are interlaced to form longitudinally elongated meshes. I find that screens of this form are superior to the common style of screen because the sinuosity of the wires imparts a rolling movement rather than a sliding movement to the material to be screened, thereby causing the fine particles to be quickly loosened from the coarser material. Where the material slides down the screen, a considerable portion of the fine material is carried over the screen on top of the coarser material and does not sift through.

I may provide suitable legs or props 14 hinged to the back of the apron or to the sides, to retain the frame and screen at any desired angle.

Portability is given the screen by providing the wheels 15, 15, journaled at the upper corners of the depressed apron, and in order to render the device compact when transporting the same from place to place, I provide a suitable fastening, as a hook 16, pivotally secured to the under face of the chute 7 and adapted to take over one of the legs 14 to retain the latter snugly in position.

In operation, the sand or gravel is tossed or deposited on the screen near its upper end in the usual manner, the fine particles falling through the meshes of the screen, while the coarser particles roll down off the screen and onto the extension 2. The screened particles falling into the channels between the ribs are conducted to the lower recessed end of the apron and are shunted off onto the chute 7 which may discharge the material into a wheelbarrow or onto the ground as preferred.

In order to transport the screen from place to place, the legs are brought close to the back and the hook caught over at least one of the legs, whereupon the operator can raise the foot of the screen and trundle the device to any desired position on the wheels 15.

Having thus fully disclosed my invention, what I claim as new, is:—

1. A screening device comprising sides and a depressed apron, shoulders formed at the juncture of the sides and apron, catches secured to the sides above the shoulders, a sliding screen removably received and supported on the shoulders and held in place by the catches, abutments at the lower ends of the shoulders projecting at approximate right angles to the sides and extension and located at the juncture thereof, an extension projecting in the same plane with and at the lower end of the screen, the lower end of the apron being offset from the extension, leaving an open space between the head of the extension and the foot of the apron to form a discharge orifice.

2. A portable metallic screen comprising sides, a plate connecting the lower ends of the sides, a depending apron connecting the upper ends of the sides, the apron being gradually inclined from its head to its foot and terminating short of the head of the plate to leave a discharge opening, a chute carried by the head of the plate and extending partially across the opening, a screen removably received between the sides, means on which the lower end of the screen rests when in inclined position, the plate constituting an extension of the screen, and means for retaining the frame at any desired angle.

In testimony whereof, I affix my signature in presence of two witnesses.

JACOB HENRY GMELIN.

Witnesses:
  HARLEY C. ALGER,
  RICHARD SURGESON.